# 2,755,218

3,4-METHYLENEDIOXYPHENYL ESTERS OF AROMATIC SULFONIC ACIDS AS SYNERGISTS FOR PYRETHRINS AND PYRETHRIN-TYPE COMPOUNDS

Morton Beroza, Greenbelt, Md.

No Drawing. Application June 15, 1955,
Serial No. 515,799

15 Claims. (Cl. 167—33)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

The patent rights for the United States in any invention in the patent to be granted on this application are dedicated to the public.

This invention relates to new compounds, namely, 3,4-methylenedioxyphenyl aromatic sulfonates and to a process for preparing them. The invention relates further to insecticidal compositions containing pyrethrins or pyrethrin-type compounds and these new 3,4-methylenedioxyphenyl aromatic sulfonates as synergists therefor.

Pyrethrins and pyrethrin-type compounds, such as allethrin, are very useful due to their quick paralyzing or knockdown action on flies, gnats, mosquitoes, and the like. In use, they are generally mixed with inert carriers in low concentration because of their high cost. In many cases a synergist is added. Such synergists have little or no insecticidal property in themselves but increase the action of the pyrethrins or pyrethrin-type compounds and thereby effect a saving in the use of these expensive materials.

According to the invention there are provided 3,4-methylenedioxyphenyl esters of aromatic sulfonic acids having the general formula

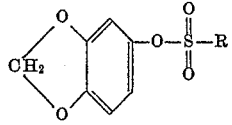

wherein R is an aryl radical, particularly phenyl, p-chlorophenyl, p-tolyl, and beta-naphthyl.

These compounds are prepared by reacting sesamol with the corresponding aromatic sulfonyl halide.

The following method illustrating the preparation of the phenyl ester of 3,4-methylenedioxyphenyl sulfonic acid, is typical of the procedure used in preparing these compounds.

Benzenesulfonyl chloride is gradually added to an equimolar amount of sesamol dissolved in excess pyridine and benzene. After heating for one-half hour on a steam bath, or standing overnight, the product is allowed to stand an hour with water and then taken up in ether, washed with alkali, water, and saturated salt solution. After drying over sodium sulfate, the ether solution is evaporated and the residue is distilled or crystallized (usually from ether). Yield was 80% of theory.

The p-chlorophenyl, the p-tolyl, and the beta-naphthyl esters of 3,4-methylenedioxyphenyl sulfonic acid were prepared by following the foregoing procedure and substituting p-chlorobenzenesulfonyl chloride, p-toluenesulfonyl chloride, and beta-naphthalenesulfonyl chloride, respectively, for the benzenesulfonyl chloride.

The following Table I gives chemical data on the aforementioned esters:

Table I

| 3,4-methylenedioxyphenyl sulfonate wherein R is— | Carbon | | Hydrogen | | Melting Point, °C. (corr.) | Cryst. Solvent | Yield, percent |
|---|---|---|---|---|---|---|---|
| | Calc'd | Found | Calc'd | Found | | | |
| phenyl | 56.1 | 56.18 | 3.62 | 3.61 | 62.5–63.5 | ether-pet. ether. | 80 |
| p-chlorophenyl | 49.95 | 50.20 | 2.90 | 2.84 | 84.5–85.5 | ether | 75 |
| p-tolyl | 57.5 | 57.80 | 4.14 | 4.18 | 86.0–87.0 | ___do___ | 85 |
| beta-naphthyl | 62.2 | 62.19 | 3.68 | 3.65 | 89.0–90.0 | ___do___ | 76 |

I have found further that the sulfonates of the invention act as synergists for pyrethrins and pyrethrin-type compounds such as allethrin. The synergistic results obtained with these sulfonates are shown in the data in the following Table II.

In the entomological procedure on which these data are based, the turntable method was employed, 100 houseflies per test being used, and in the pyrethrins and allethrin test solutions used against the houseflies refined kerosene was used as the common solvent for the synergist and the respective pyrethrins and allethrin, acetone being added when necessary to increase the solubility of the synergist.

The pyrethrins test solutions each contained a total of 10 mg. of synergist and 1 mg. of pyrethrins per ml. of solvent, and the allethrin test solutions each contained a total of 5 mg. of synergist and .5 mg. of allethrin per ml. of solvent. The per cent mortality of the houseflies in 24 hours using these test solutions is listed in Table II, following hereinafter.

As controls, the sulfonates, when used alone at 10 mg. per ml. of solvent, that is, without added pyrethrins or allethrins, gave a low mortality, usually below 3% after 24 hours. Pyrethrins alone, that is, without added synergist, gave the following mortalities in 24 hours at the recited concentrations in mg. per ml. of solvent.

Concentration:          Per cent mortality
2.3 _____ 48
3.4 _____ 67
5.1 _____ 80
7.6 _____ 93

Allethrin alone, that is, without added synergist, gave the following mortalities of houseflies in 24 hours at the recited concentrations in mg. per ml. of solvent.

Concentration: | Per cent mortality
--- | ---
.39 | 17
.59 | 37
.89 | 64
1.3 | 83
2.0 | 92

*Table II*

| 3,4-methylenedioxyphenyl sulfonate wherein R is— | Percent mortality in 24 hours Pyrethrins Test Solution | Percent mortality in 24 hours Allethrin Test Solution |
| --- | --- | --- |
| phenyl | 100 | 99 |
| p-chlorophenyl | 96 | 93 |
| p-tolyl | 92 | 94 |
| beta-naphthyl | 75 | 79 |

The proportions of the sulfonates and the pyrethrins or the pyrethrin-type compounds may be varied over a wide range. The preferred ranges, however, are about from 0.15–2.0 mg. pyrethrins or pyrethrin-type compound per ml. of solvent with from 1.0 to 20 mg. of the 3,4-methylenedioxyphenyl sulfonate per ml. of solvent.

The compositions may be formulated with other conventional materials commonly used in the insecticide art, such as carriers, toxic materials and other additives.

What is claimed is:

1. A 3,4-methylenedioxyphenyl ester of a sulfonic acid having the formula

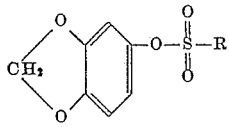

wherein R is an aryl radical selected from the group consisting of phenyl, p-chlorophenyl, p-tolyl, and beta-naphthyl.

2. The ester of claim 1 wherein R is phenyl.
3. The ester of claim 1 wherein R is p-chlorophenyl.
4. The ester of claim 1 wherein R is p-tolyl.
5. The ester of claim 1 wherein R is beta-naphthyl.

6. A process of preparing a 3,4-methylenedioxyphenyl ester of a sulfonic acid having the formula

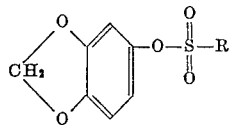

wherein R is an aryl radical selected from the group consisting of phenyl, p-chlorophenyl, p-tolyl, and beta-naphthyl, comprising reacting sesamol with the corresponding arylsulfonyl halide.

7. The process of claim 6 wherein the arylsulfonyl halide is benzenesulfonyl halide.
8. The process of claim 6 wherein the arylsulfonyl halide is p-chlorobenzenesulfonyl halide.
9. The process of claim 6 wherein the arylsulfonyl halide is p-toluenesulfonyl halide.
10. The process of claim 6 wherein the arylsulfonyl halide is betanaphthalenesulfonyl halide.

11. An insecticidal composition comprising a member selected from the group consisting of pyrethrins and allethrin, and, as a synergist therefor, a 3,4-methylenedioxyphenyl ester of a sulfonic acid having the formula

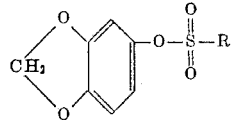

wherein R is an aryl radical selected from the group consisting of phenyl, p-chlorophenyl, p-tolyl, and beta-naphthyl.

12. The composition of claim 11 wherein R is phenyl.
13. The composition of claim 11 wherein R is p-chlorophenyl.
14. The composition of claim 11 wherein R is p-tolyl.
15. The composition of claim 11 wherein R is beta-naphthyl.

References Cited in the file of this patent

UNITED STATES PATENTS

| 2,486,445 | Synerholm | Nov. 1, 1949 |
| 2,486,579 | Synerholm | Nov. 1, 1949 |